United States Patent
Vacherand et al.

(10) Patent No.: US 10,654,317 B2
(45) Date of Patent: May 19, 2020

(54) TIRE INCLUDING AN OUTER SIDEWALL THAT COMPRISES AN INCOMPATIBLE POLYMER

(71) Applicants: COMPAGNIE GENERALE DES ETABLISSEMENTS MICHELIN, Clermont-Ferrand (FR); Michelin Recherche et Technique S.A., Granges-Paccot (CH)

(72) Inventors: Jean-Michel Vacherand, Clermont-Ferrand (FR); Romain Libert, Clermont-Ferrand (FR); Marc Greiveldinger, Clermont-Ferrand (FR)

(73) Assignee: COMPAGNIE GENERALE DES ETABLISSEMENTS MICHELIN, Clermont-Ferrand (FR)

(*) Notice: Subject to any disclaimer, the term of this patent is extended or adjusted under 35 U.S.C. 154(b) by 58 days.

(21) Appl. No.: 15/526,420

(22) PCT Filed: Nov. 24, 2015

(86) PCT No.: PCT/EP2015/077491
§ 371 (c)(1),
(2) Date: May 12, 2017

(87) PCT Pub. No.: WO2016/083367
PCT Pub. Date: Jun. 2, 2016

(65) Prior Publication Data
US 2017/0313131 A1 Nov. 2, 2017

(30) Foreign Application Priority Data
Nov. 25, 2014 (FR) ...................... 14 61414

(51) Int. Cl.
*B60C 1/00* (2006.01)
*C08L 7/00* (2006.01)
(Continued)

(52) U.S. Cl.
CPC .......... *B60C 1/0025* (2013.01); *B60C 13/002* (2013.01); *C08J 3/005* (2013.01);
(Continued)

(58) Field of Classification Search
CPC .................................................. B60C 1/0025
See application file for complete search history.

(56) References Cited

U.S. PATENT DOCUMENTS 3,464,477 A 9/1969 Verdier
5,964,969 A 10/1999 Sandstrom et al. .......... 152/524
(Continued)

FOREIGN PATENT DOCUMENTS

EP 1127909 A1 8/2001
EP 1270273 A1 1/2003
(Continued)

OTHER PUBLICATIONS

International Search Report dated Jan. 13, 2016, issued by EPO in connection with International Application No. PCT/EP2015/077491.

*Primary Examiner* — Peter F Godenschwager
(74) *Attorney, Agent, or Firm* — Venable LLP (57) ABSTRACT

A tire is provided with an external sidewall, said external sidewall comprising at least one elastomeric composition based on: (a) an elastomeric matrix comprising at least one diene elastomer, (b) a crosslinking system, and (c) at least one polymer incompatible with the elastomeric matrix. A process for the preparation of an elastomeric composition for an external sidewall is also disclosed.

7 Claims, 1 Drawing Sheet

(51) Int. Cl.
   *C08K 5/09*   (2006.01)
   *C08K 5/18*   (2006.01)
   *C08K 3/06*   (2006.01)
   *C08L 23/20*  (2006.01)
   *B60C 13/00*  (2006.01)
   *C08J 3/00*   (2006.01)
   *C08J 3/20*   (2006.01)
   *C08L 9/00*   (2006.01)
   *C08K 3/22*   (2006.01)

(52) U.S. Cl.
   CPC ............... *C08J 3/203* (2013.01); *C08K 3/06* (2013.01); *C08K 5/09* (2013.01); *C08K 5/18* (2013.01); *C08L 7/00* (2013.01); *C08L 9/00* (2013.01); *C08L 23/20* (2013.01); *C08J 2307/00* (2013.01); *C08J 2309/00* (2013.01); *C08J 2407/00* (2013.01); *C08J 2409/00* (2013.01); *C08K 2003/2296* (2013.01)

(56) References Cited

U.S. PATENT DOCUMENTS

| | | |
|---|---|---|
| 5,977,238 A | 11/1999 | Labauze |
| 6,013,718 A | 1/2000 | Cabioch et al. |
| 6,503,973 B2 | 1/2003 | Robert et al. |
| 6,666,248 B2 | 12/2003 | Omoto et al. |
| 6,774,255 B1 | 8/2004 | Tardivat et al. |
| 6,815,473 B2 | 11/2004 | Robert et al. |
| 7,217,751 B2 | 5/2007 | Durel et al. |
| 7,300,970 B2 | 11/2007 | Durel et al. |
| 7,312,264 B2 | 12/2007 | Gandon-Pain |
| 7,488,768 B2 | 2/2009 | Tardivat et al. |
| 7,491,767 B2 | 2/2009 | Durel et al. |
| 7,820,771 B2 | 10/2010 | Lapra et al. |
| 7,875,670 B2 * | 1/2011 | Lin .................. C08K 5/01 524/474 |
| 8,461,269 B2 | 6/2013 | Varagniat et al. |
| 8,492,475 B2 | 7/2013 | Araujo Da Silva et al. |
| 8,883,929 B2 | 11/2014 | Gandon-Pain et al. |
| 2002/0183436 A1 | 12/2002 | Robert et al. |
| 2004/0051210 A1 | 3/2004 | Tardivat et al. |
| 2004/0132880 A1 | 7/2004 | Durel et al. |
| 2005/0016650 A1 | 1/2005 | Durel et al. |
| 2005/0016651 A1 | 1/2005 | Durel et al. |
| 2006/0089445 A1 | 4/2006 | Gandon-Pain |
| 2008/0132644 A1 | 6/2008 | Lapra et al. |
| 2009/0186961 A1 | 7/2009 | Araujo Da Silva et al. |
| 2009/0209709 A1 | 8/2009 | Araujo Da Silva et al. |
| 2009/0234066 A1 | 9/2009 | Araujo Da Silva et al. |
| 2009/0270558 A1 | 10/2009 | Gandon-Pain et al. |
| 2010/0022714 A1 | 1/2010 | Varagniat et al. |
| 2011/0021702 A1 | 1/2011 | Gandon-Pain et al. |
| 2011/0152458 A1 | 6/2011 | Araujo Da Silva et al. |
| 2012/0208948 A1 | 8/2012 | Gandon-Pain et al. |
| 2014/0299249 A1 | 10/2014 | Custodero et al. |
| 2014/0343190 A1 | 11/2014 | Custodero et al. |
| 2015/0258753 A1 | 9/2015 | Custodero et al. |

FOREIGN PATENT DOCUMENTS

| | | |
|---|---|---|
| FR | 1502689 | 11/1967 |
| FR | 2274645 A1 | 1/1976 |
| FR | 2740778 A1 | 5/1997 |
| FR | 2765882 A1 | 1/1999 |
| GB | 1501922 | 2/1978 |
| WO | 97/36724 A2 | 10/1997 |
| WO | 99/16600 A1 | 4/1999 |
| WO | 01/92402 A1 | 12/2001 |
| WO | 02/30939 A1 | 4/2002 |
| WO | 02/31041 A1 | 4/2002 |
| WO | 02/083782 A1 | 10/2002 |
| WO | 03/002648 A1 | 1/2003 |
| WO | 03/002649 A1 | 1/2003 |
| WO | 2004/096865 A1 | 11/2004 |
| WO | 2006/047509 A2 | 5/2006 |
| WO | 2006/069792 A1 | 7/2006 |
| WO | 2006069793 A1 | 7/2006 |
| WO | 2006/125532 A1 | 11/2006 |
| WO | 2006/125533 A1 | 11/2006 |
| WO | 2006/125534 A1 | 11/2006 |
| WO | 2008/003434 A1 | 1/2008 |
| WO | 2008/003435 A1 | 1/2008 |

* cited by examiner

TIRE INCLUDING AN OUTER SIDEWALL THAT COMPRISES AN INCOMPATIBLE POLYMER

FIELD OF THE INVENTION

The present invention relates to tyres and more particularly to the outer sidewalls of tyres.

RELATED ART

It is possible to define, within the tyre, three types of regions:

The radially exterior region in contact with the ambient air, this region being essentially composed of the tread and of the external sidewall of the tyre. An external sidewall is an elastomeric layer positioned outside the carcass reinforcement with respect to the internal cavity of the tyre, between the crown and the bead, so as to completely or partially cover the region of the carcass reinforcement extending from the crown to the bead.

The radially interior region in contact with the inflation gas, this region generally being composed of the layer airtight to the inflation gas, sometimes known as inner liner.

The internal region of the tyre, that is to say that between the exterior and interior regions. This region includes layers or plies which are referred to here as internal layers of the tyre. These are, for example, carcass plies, tread underlayers, tyre belt plies or any other layer which is not in contact with the ambient air or the inflation gas of the tyre.

The external sidewall can, depending on the requirements, comprise one or more protective plies, located on the outside with respect to the carcass reinforcement, the role of which protective plies is to protect the rest of the structure of the sidewall from external attacks: impacts, tears or other perforations.

This is, for example, the case in the sidewalls of certains tyres intended for rolling over relatively rough ground, for example on rally-type passenger vehicles or else on industrial off-road vehicles of the construction site type.

These protective plies must be sufficiently flexible and deformable so as, on the one hand, to follow as closely as possible the shape of the obstacle on which the sidewall is liable to bear during rolling and, on the other hand, to prevent the possible penetration of foreign bodies towards the inside of said sidewall. To meet such criteria generally requires the use, in these protective plies or layers, of reinforcing threads in the form of elastic metal-strand cords combining a high elasticity and a high breaking energy.

Such metallic protective plies for tyre sidewalls are well known, they have been described, for example, in Patents or Patent Applications FR 1 502 689 (or U.S. Pat. No. 3,464,477), EP 1 270 273 (or US 2003/0005993).

However, they exhibit a certain number of disadvantages. Besides the fact that they consequently make the sidewalls of the tyres heavier, they are formed from strand cords which are relatively expensive, on two accounts: first, they are prepared in two stages, namely by prior manufacture of the strands, followed by assembling these strands by twisting; secondly, they generally require a high twist of their wires (i.e., very short helical pitches), a twist which is admittedly essential in order to confer on them the desired elasticity but which involves reduced manufacturing rates. This disadvantage, of course, has repercussions on the cost of the tyres themselves.

Consequently, such modifications to the external sidewall are not applicable to tyres intended for passenger vehicles.

Nevertheless, there is a high demand from users to have available tyres, in particular tyres intended for passenger vehicles, which comprise sidewalls resistant to external attacks, such as impacts, tears or perforations. It concerns in particular the contacts between the tyre and the pavement, which can seriously damage, indeed even perforate, the tyre.

There thus exists a need to develop a tyre external sidewall which is more resistant to outside attacks without, however, significantly increasing its weight.

The Applicant Companies have thus developed a tyre comprising an external sidewall with a low coefficient of friction starting from an elastomeric composition comprising a polymer incompatible with the elastomeric matrix.

BRIEF DESCRIPTION OF EMBODIMENTS OF THE INVENTION

A subject-matter of the invention is thus a tyre provided with an external sidewall, said external sidewall comprising at least one elastomeric composition based on:

a) an elastomeric matrix comprising at least one diene elastomer,
b) a crosslinking system,
c) at least one polymer incompatible with the elastomeric matrix.

The tyre according to the invention comprising the external sidewall with a low coefficient of friction makes it possible to cause the outside attacker "to slide" over the sidewall and in particular prevents the penetration into the sidewall of an outside attacker or at least minimizes the depth to which the sidewall is attacked during the rubbing of the latter over the outside attacker.

Furthermore, this external sidewall does not necessarily comprise protection by metal and it is consequently easier and faster to prepare. Thus, the cost prices of the tyre according to the invention are reduced, in comparison with tyres comprising sidewalls comprising protection by metal.

Finally, in the case where the external sidewall does not comprise protection by metal, it is more flexible, which improves the perception of comfort for the user, in comparison with a sidewall comprising protection by metal.

Another subject-matter of the invention is a process for preparing an elastomeric composition for the manufacture of tyres as defined above, characterized in that it comprises the following stages:

incorporating the optional reinforcing filler or fillers in the elastomeric matrix during a first stage, everything being kneaded thermomechanically, in one or more goes, until a maximum temperature $T_1$ of between 110° C. and 190° C. is reached, then incorporating the incompatible polymer or polymers in the mixture during a second stage, until a temperature $T_2$ of greater than 110° C. is reached, then subsequently incorporating, during a third stage, the crosslinking system and kneading everything to a maximum temperature of less than 90° C.

DETAILED DESCRIPTION OF THE EMBODIMENTS

Figure 1:
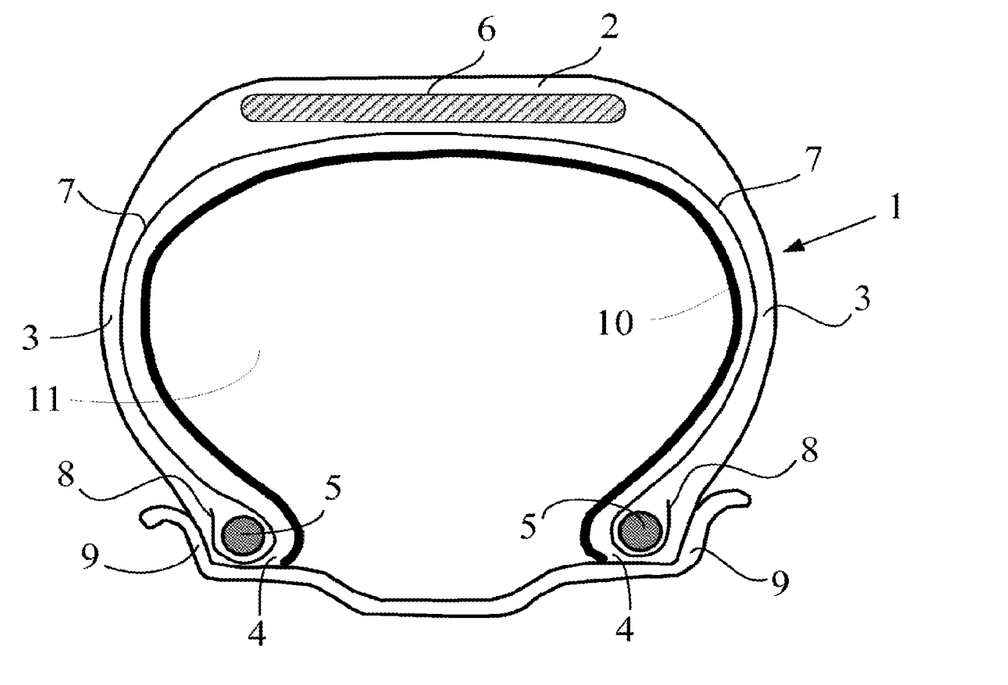
FIG. 1 diagrammatically represents a radial cross-section of a tire in accordance with the invention.

The invention and its advantages will be easily understood in the light of the description and implementational examples which follow and of the single FIGURE which diagrammatically represents, in radial cross section, a tyre in accordance with the invention.

In the present description, unless expressly indicated otherwise, all the percentages (%) shown are % by weight.

Furthermore, any interval of values denoted by the expression "between a and b" represents the range of values extending from more than a to less than b (that is to say, limits a and b excluded), whereas any interval of values denoted by the expression "from a to b" means the range of values extending from a up to b (that is to say, including the strict limits a and b).

In the present patent application, "part per hundred parts of elastomer" or "phr" is understood to mean the part by weight of a constituent per 100 parts by weight of the elastomer or elastomers, that is to say of the total weight of the elastomer or elastomers of the elastomeric matrix. Thus, a constituent at 60 phr will mean, for example, 60 g of this constituent per 100 g of elastomer.

Furthermore, it should be noted that the incompatible polymer or polymers are not regarded, within the meaning of the present invention, as forming part of the elastomeric matrix.

The expression "composition based on" should be understood as meaning a composition comprising the mixture and/or the product of the in situ reaction of the various base constituents used, some of these constituents being able to react and/or being intended to react with one another, at least partially, during the various phases of manufacture of the composition or during the subsequent curing, modifying the composition as it is prepared at the start. Thus, the compositions as employed for the invention can be different in the non-crosslinked state and in the crosslinked state.

Thus, a first subject-matter of the invention is a tyre provided with an external sidewall, said external sidewall comprising at least one elastomeric composition based on:
 a) an elastomeric matrix comprising at least one diene elastomer,
 b) a crosslinking system,
 c) at least one polymer incompatible with the elastomeric matrix.

"Polymer incompatible with the elastomeric matrix" in the present patent application is understood to mean that the mixture of this polymer and of the elastomeric matrix exhibits at least two glass transition temperatures (Tg).

In the present description, unless expressly indicated otherwise, the glass transition temperature or temperatures are defined as the temperature or temperatures for which the intersection between the straight line tangent to the glassy plateau and the straight line tangent to the zone of transition between the glassy plateau and the rubbery plateau is observed, during the temperature sweep of a crosslinked sample (size of the sample length: 6 mm, width: 5 mm, thickness: 2 mm) subjected to a sinusoidal stress (frequency of 10 Hz). As indicated above, this or these Tg value(s) are measured during the measurement of the dynamic properties on a viscosity analyser (DVA 200—IT Instrumental Control), according to Standard JIS K 6384 (Testing Methods for Dynamic Properties of Vulcanized Rubber and Thermoplastic Rubber).

As explained above, the elastomeric composition which can be used in the external sidewall of the tyre according to the invention comprises an elastomeric matrix comprising at least one diene elastomer.

"Elastomeric matrix" in the present patent application denotes all of the elastomers of the elastomeric composition except the polymer incompatible with the elastomeric matrix.

Diene elastomer should be understood, in a known way, as an elastomer resulting at least in part, that is to say a homopolymer or a copolymer, from diene monomers.

In a way known per se, a diene monomer is a monomer comprising two conjugated or non-conjugated carbon—carbon double bonds.

The diene elastomer or elastomers which can be used according to the invention can be classified into two categories: "essentially unsaturated" or "essentially saturated".

"Essentially unsaturated" is generally understood to mean a diene elastomer resulting at least in part from conjugated diene monomers, having a content of units resulting from a conjugated diene which is greater than 15 mol %.

"Highly unsaturated" diene elastomer is understood in particular to mean a diene elastomer having a content of units resulting from a conjugated diene which is greater than 50 mol %.

Conversely, "essentially saturated" is generally understood to mean a diene elastomer resulting at least in part from conjugated diene monomers, having a content of units resulting from a conjugated diene which is less than or equal to 15 mol %.

It is because of this that diene elastomers such as some butyl rubbers or copolymers of dienes and of α-olefins of EPDM type can be described as "essentially saturated" diene elastomers.

Preferably, the diene elastomer or elastomers of the elastomeric matrix which can be used in the tyre of the invention are chosen from essentially unsaturated diene elastomers and the mixtures of these elastomers.

Essentially unsaturated diene elastomer capable of being used in the elastomeric composition of the external sidewall of the tyre in accordance with the invention is understood more particularly to mean:
 (a) any homopolymer obtained by polymerization of a conjugated diene monomer having from 4 to 12 carbon atoms;
 (b) any copolymer obtained by copolymerization of one or more conjugated dienes with one another or with one or more vinylaromatic compounds having from 8 to 20 carbon atoms;
 (c) a ternary copolymer obtained by copolymerization of ethylene and of an α-olefin having from 3 to 6 carbon atoms with a non-conjugated diene monomer having from 6 to 12 carbon atoms, such as, for example, the elastomers obtained from ethylene and propylene with a non-conjugated diene monomer of the abovementioned type, such as, in particular, 1,4-hexadiene, ethylidenenorbornene or dicyclopentadiene,
 (d) the mixtures of these polymers.

The following are suitable in particular as conjugated dienes: 1,3-butadiene, 2-methyl-1,3-butadiene, 2,3-di($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, an aryl-1,3-butadiene, 1,3-pentadiene or 2,4-hexadiene.

The following, for example, are suitable as vinylaromatic compounds: styrene, ortho-, meta- or para-methylstyrene, the "vinyltoluene" commercial mixture, para-(tert-butyl) styrene, methoxystyrenes, chlorostyrenes, vinylmesitylene, divinylbenzene or vinylnaphthalene.

When the essentially unsaturated diene elastomer or elastomers are chosen from the copolymers obtained by copolymerization of one or more conjugated dienes with one another or with one or more vinylaromatic compounds having from 8 to 20 carbon atoms, these can contain between 99% and 20% by weight of conjugated diene units and between 1% and 80% by weight of vinylaromatic units.

The diene elastomers which can be used according to the invention can have any microstructure, which depends on the polymerization conditions used, in particular on the presence or absence of a modifying and/or randomizing agent and on the amounts of modifying and/or randomizing agent employed.

The diene elastomers which can be used according to the invention can, for example, be prepared in dispersion or in solution; they can be coupled and/or star-branched or else functionalized with a coupling and/or star-branching or functionalization agent. For coupling with carbon black, mention may be made, for example, of functional groups comprising a C—Sn bond or aminated functional groups, such as benzophenone, for example; for coupling to a reinforcing inorganic filler, such as silica, mention may be made, for example, of silanol functional groups or polysiloxane functional groups having a silanol end (such as described, for example, in FR 2 740 778 or U.S. Pat. No. 6,013,718), alkoxysilane groups (such as described, for example, in FR 2 765 882 or U.S. Pat. No. 5,977,238), carboxyl groups (such as described, for example, in WO 01/92402 or U.S. Pat. No. 6,815,473, WO 2004/096865 or US 2006/0089445) or else polyether groups (such as described, for example, in EP 1 127 909 or U.S. Pat. No. 6,503,973).

Mention may also be made, as other examples of functionalized elastomers, of elastomers (such as SBR, BR, NR or IR) of the epoxidized type.

Suitable as diene elastomer which can be used in the elastomeric composition of the external sidewall of the tyre according to the invention are polybutadienes and in particular those having a content (mol %) of 1,2-units of between 4% and 80% or those having a content (mol %) of cis-1,4-units of greater than 80%, polyisoprenes, butadiene/styrene copolymers and in particular those having a glass transition temperature, Tg, (measured according to ASTM D3418) of between 0° C. and −70° C. and more particularly between −10° C. and −60° C., a styrene content of between 5% and 60% by weight and more particularly between 20% and 50%, a content (mol %) of 1,2-bonds of the butadiene part of between 4% and 75% and a content (mol %) of trans-1,4-bonds of between 10% and 80%, butadiene/isoprene copolymers and in particular those having an isoprene content of between 5% and 90% by weight and a Tg of −40° C. to −80° C., or isoprene/styrene copolymers and in particular those having a styrene content of between 5% and 50% by weight and a Tg of between −25° C. and −50° C. In the case of butadiene/styrene/isoprene copolymers, suitable in particular are those having a styrene content of between 5% and 50% by weight and more particularly of between 10% and 40%, an isoprene content of between 15% and 60% by weight and more particularly of between 20% and 50%, a butadiene content of between 5% and 50% by weight and more particularly of between 20% and 40%, a content (mol %) of 1,2-units of the butadiene part of between 4% and 85%, a content (mol %) of trans-1,4-units of the butadiene part of between 6% and 80%, a content (mol %) of 1,2-plus 3,4-units of the isoprene part of between 5% and 70% and a content (mol %) of trans-1,4-units of the isoprene part of between 10% and 50%, and more generally any butadiene/styrene/isoprene copolymer having a Tg of between −20° C. and −70° C.

The diene elastomer or elastomers which can be used according to the invention can very particularly be chosen from isoprene elastomers.

"Isoprene elastomer" is understood to mean, in a known way, an isoprene homopolymer or copolymer, in other words a diene elastomer selected from the group consisting of natural rubber (NR), synthetic polyisoprenes (IRs), various isoprene copolymers and the mixtures of these elastomers.

Mention will in particular be made, among the isoprene copolymers, of isoprene/styrene (SIR), isoprene/butadiene (BIR) or isoprene/butadiene/styrene (SBIR) copolymers.

Preferably, the isoprene elastomers are chosen from natural rubber and synthetic cis-1,4-polyisoprene.

Use is preferably made, among synthetic polyisoprenes, of the polyisoprenes having a content (mol %) of cis-1,4-bonds of greater than 90%, more preferably still of greater than 98%.

Preferably, the diene elastomer or elastomers which can be used in the sidewall of the tyre according to the invention are chosen from the homopolymers obtained by polymerization of a conjugated diene monomer having from 4 to 12 carbon atoms, the copolymers obtained by copolymerization of one or more conjugated diene monomers with one another or with one or more vinylaromatic compounds having from 8 to 20 carbon atoms, and the mixtures of these polymers.

Particularly preferably, the diene elastomer or elastomers are chosen from polybutadienes (abbreviated to "BRs"), synthetic polyisoprenes (IRs), natural rubber (NR), butadiene copolymers, isoprene copolymers, butadiene/styrene copolymers (SBRs), isoprene/butadiene copolymers (BIRs), isoprene/styrene copolymers (SIRs) and isoprene/butadiene/styrene copolymers (SBIRs), and the mixtures of these elastomers.

The content of diene elastomers in the elastomeric composition which can be used in the sidewall of the tyre according to the invention generally ranges from 60 to 100 phr and preferably from 70 to 100 phr.

In a particularly preferred embodiment of the present invention, the diene elastomer or elastomers represent the sole constituent elastomer or elastomers of the elastomeric matrix, that is to say that the content of diene elastomers in the elastomeric composition which can be used in the sidewall of the tyre according to the invention is 100 phr.

As stated above, the elastomeric composition of the external sidewall which can be used in the tyre according to the invention also comprises a crosslinking system.

The crosslinking system can be a vulcanization system. In this case, it is preferably based on sulphur or based on a sulphur donor and on a primary vulcanization accelerator.

Mention may be made, among sulphur donors, for example, of alkylphenol disulphides (APDSs), such as, for example, para-(tert-butyl)phenol disulphide.

The sulphur or sulphur donor is generally used at a preferred content ranging from 0.5 to 10 phr, more preferably ranging from 0.5 to 5.0 phr, for example ranging from 0.5 to 3.0 phr.

Use may be made, as primary accelerator, of any compound capable of acting as accelerator for the vulcanization of diene elastomers in the presence of sulphur, in particular accelerators of the thiazole type, and also their derivatives, or accelerators of thiuram or zinc dithiocarbamate type. These accelerators are more preferably selected from the group consisting of 2-mercaptobenzothiazole disulphide (abbreviated to "MBTS"), N-cyclohexyl-2-benzothiazole-sulphenamide (abbreviated to "CBS"), N,N-dicyclohexyl-2-benzothiazolesulphenamide (abbreviated to "DCBS"), N-(tert-butyl)-2-benzothiazolesulphenamide (abbreviated to "TBBS"), N-(tert-butyl)-2-benzothiazolesulphenimide (abbreviated to "TBSI"), zinc dibenzyldithiocarbamate (abbreviated to "ZBEC") and the mixtures of these compounds.

Preferably, use is made of a primary accelerator of the sulphenamide type.

Additional to this vulcanization system are optionally various known secondary vulcanization accelerators or vulcanization activators, such as zinc oxide, stearic acid, guanidine derivatives (in particular diphenylguanidine), and the like.

The content of each primary or secondary vulcanization accelerator and of each vulcanization activator generally ranges from 0.5 to 5.0 phr.

As stated above, the elastomeric composition of the external sidewall which can be used in the tyre according to the invention also comprises one or more incompatible polymers.

Preferably, the incompatible polymer or polymers are chosen from polymers having a number-average molecular weight of less than or equal to 20 000 g/mol, preferably of less than or equal to 10 000 g/mol, more preferably ranging from 200 to 4000 g/mol and more preferably still ranging from 200 to 3000 g/mol.

The number-average molecular weight (Mn) of the incompatible polymer or polymers can be determined in a way known per se by SEC.

The sample is dissolved beforehand in tetrahydrofuran at a concentration of approximately 1 g/l and then the solution is filtered through a filter with a porosity of 0.45 μm before injection. The apparatus is the Waters Alliance chromatographic line. The elution solvent is tetrahydrofuran, the flow rate is 1 ml/min, the temperature of the system is 35° C. and the analytical time is 30 min. A set of two Waters columns with the Styragel HT6E name is used. The injected volume of the solution of the polymer sample is 100 μl. The detector is a Waters 2410 differential refractometer and its associated software, for making use of the chromatographic data, is the Waters Millennium system. The calculated average molar masses are relative to a calibration curve produced with polystyrene standards.

Preferably, the incompatible polymer or polymers are chosen from polybutenes.

Particularly preferably, the incompatible polymer is a polyisobutylene.

Polybutenes, preferably polyisobutylenes, make it possible to achieve the best compromise in properties in comparison with the other oils tested, in particular with conventional oils of the paraffin type.

Given that the polymer or polymers targeted are incompatible with the elastomeric matrix, they have a tendency to come together within the elastomeric composition.

Consequently, the incompatible polymer or polymers are generally in the form of vesicles in the elastomeric composition.

Furthermore, these vesicles may have a tendency to migrate towards the surface of the external sidewall prepared by means of the elastomeric composition.

When an outside attacker is in contact with the external sidewall of the tyre according to the invention, the vesicles of incompatible polymers can break and the incompatible polymer or polymers then act as "lubricant" in order to reduce the coefficient of friction of the external sidewall.

Furthermore, the incompatible polymer or polymers have to be able "to spread" rapidly during an attack in order to reduce the surface energy.

Thus, preferably, the incompatible polymer or polymers are chosen from viscous liquids, that is to say liquids exhibiting a kinematic viscosity at 100° C. ranging from 20 to 200 000 SUS (according to Standard ASTM D2161), preferably from 100 to 100 000 SUS and more preferably from 200 to 50 000 SUS.

Thus, the outside attacker does not penetrate the external sidewall or weakly penetrates it and thus decreases the damage which may be caused to the tyre comprising this sidewall.

The content of incompatible polymer(s) in the elastomeric composition is generally less than 30 phr, preferably ranges from 1 to 20 phr and more preferably from 5 to 15 phr.

The elastomeric composition of the external sidewall which can be used in the tyre according to the invention generally additionally comprises at least one reinforcing filler.

Use may be made of any type of reinforcing filler known for its abilities to reinforce a rubber composition which can be used for the manufacture of tyres, for example carbon black, a reinforcing inorganic filler, such as silica, or also a blend of these two types of filler, in particular a blend of carbon black and silica.

All carbon blacks, used individually or in the form of mixtures, in particular blacks of the HAF, ISAF or SAF type, conventionally used in tyres ("tyre-grade" blacks) are suitable as carbon blacks. Use may also be made, according to the applications targeted, of blacks of higher series FF, FEF, GPF or SRF. The carbon blacks might, for example, be already incorporated in the diene elastomer in the form of a masterbatch, before or after grafting and preferably after grafting (see, for example, Applications WO 97/36724 or WO 99/16600).

Reinforcing inorganic filler other than carbon black should be understood, in the present patent application, by definition, as any inorganic or mineral filler as opposed to carbon black, capable of reinforcing by itself alone, without means other than an intermediate coupling agent, a rubber composition intended for the manufacture of tyres; such a filler is generally characterized, in a known way, by the presence of hydroxyl (—OH) groups at its surface.

The physical state in which the reinforcing filler is provided is not important, whether it is in the form of a powder, of micropearls, of granules, of beads or any other appropriate densified form. Of course, reinforcing filler is also understood to mean mixtures of different reinforcing fillers, in particular of highly dispersible siliceous and/or aluminous fillers as described below.

Mineral fillers of the siliceous type, in particular silica ($SiO_2$), or of the aluminous type, in particular alumina ($Al_2O_3$), are suitable in particular as reinforcing inorganic fillers other than carbon black.

Preferably, the reinforcing filler or fillers are carbon black and/or silica and preferably the reinforcing filler is carbon black.

When the reinforcing filler comprises a filler requiring the use of a coupling agent in order to establish the bond between the filler and the elastomeric matrix, the elastomeric composition in addition conventionally comprises an agent capable of effectively providing this bond. When silica is present in the elastomeric composition as reinforcing filler, use is made, in a known manner, of an at least bifunctional coupling agent (or bonding agent) intended to provide a satisfactory connection, of chemical and/or physical nature, between the inorganic filler (surface of its particles) and the elastomeric matrix, in particular bifunctional organosilanes or polyorganosiloxanes.

Use is made in particular of silane polysulphides, referred to as "symmetrical" or "asymmetrical" depending on their specific structure, such as described, for example, in Applications WO 03/002648 (or US 2005/016651) and WO 03/002649 (or US 2005/016650).

Suitable in particular, without the definition below being limiting, are silane polysulphides referred to as "symmetrical", corresponding to the following general formula (I):

in which:
x is an integer from 2 to 8, preferably from 2 to 5;
A is a divalent hydrocarbon radical, preferably $C_1$-$C_{18}$ alkylene groups or $C_6$-$C_{12}$ arylene groups, more particularly $C_1$-$C_{10}$, in particular $C_1$-$C_4$, alkylenes, especially propylene;
Z corresponds to one of the formulae below:

in which:
the $R^1$ radicals, which are substituted or unsubstituted and identical to or different from one another, represent a $C_1$-$C_{18}$ alkyl, $C_5$-$C_{18}$ cycloalkyl or $C_6$-$C_{18}$ aryl group, preferably represent $C_1$-$C_6$ alkyl, cyclohexyl or phenyl groups, in particular $C_1$-$C_4$ alkyl groups, and more particularly represent methyl and/or ethyl,
the $R^2$ radicals, which are substituted or unsubstituted and identical to or different from one another, represent a $C_1$-$C_{18}$ alkoxyl or $C_5$-$C_{18}$ cycloalkoxyl group, preferably represent a group chosen from $C_1$-$C_8$ alkoxyls and $C_5$-$C_8$ cycloalkoxyls, more preferably still represent a group chosen from $C_1$-$C_4$ alkoxyls, and in particular represent a methoxyl and ethoxyl group.

In the case of a mixture of alkoxysilane polysulphides corresponding to the above formula (I), in particular normal commercially available mixtures, the mean value of the "x" indices is a fractional number preferably of between 2 and 5, more preferably of approximately 4. However, the invention can also advantageously be carried out, for example, with alkoxysilane disulphides (x=2).

Mention will more particularly be made, as examples of silane polysulphides, of bis(($C_1$-$C_4$)alkoxyl($C_1$-$C_4$)alkylsilyl($C_1$-$C_4$)alkyl) polysulphides (in particular disulphides, trisulphides or tetrasulphides), such as, for example, bis(3-trimethoxysilylpropyl) or bis(3-triethoxysilylpropyl) polysulphides. Use is made in particular, among these compounds, of bis(3-triethoxysilylpropyl) tetrasulphide, abbreviated to TESPT, of formula $[(C_2H_5O)_3Si(CH_2)_3S_2]_2$, or bis(triethoxysilylpropyl) disulphide, abbreviated to TESPD, of formula $[(C_2H_5O)_3Si(CH_2)_3S]_2$. Mention will also be made, as preferred examples, of bis(mono($C_1$-$C_4$)alkoxyldi($C_1$-$C_4$)alkylsilylpropyl) polysulphides (in particular disulphides, trisulphides or tetrasulphides), more particularly bis(monoethoxydimethylsilylpropyl) tetrasulphide, such as described in Patent Application WO 02/083782 (or US 2004/132880).

Mention will in particular be made, as coupling agent other than an alkoxysilane polysulphide, of bifunctional POSs (polyorganosiloxanes) or else of hydroxysilane polysulphides ($R^2$=OH in the above formula (I)), such as described in Patent Applications WO 02/30939 (or U.S. Pat. No. 6,774,255) and WO 02/31041 (or US 2004/051210), or else of silanes or POSs bearing azodicarbonyl functional groups, such as described, for example, in Patent Applications WO 2006/125532, WO 2006/125533 and WO 2006/125534.

In the elastomeric matrix which can be used according to the invention, the content of coupling agent preferably ranges from 0.5 to 12 phr, it being understood that it is in general desirable to use as little as possible of it. The presence of the coupling agent depends on the presence of the reinforcing inorganic filler other than carbon black. Its content is easily adjusted by a person skilled in the art according to the content of this filler; it is typically of the order of 0.5% to 15% by weight, with respect to the amount of reinforcing inorganic filler other than carbon black.

A person skilled in the art will understand that, as filler equivalent to the reinforcing inorganic filler other than carbon black, a reinforcing filler of another nature might be used provided that this reinforcing filler is covered with an inorganic layer, such as silica, or else comprises functional sites, in particular hydroxyl sites, at its surface requiring the use of a coupling agent in order to form the bond between the filler and the elastomeric matrix.

The elastomeric composition which can be used according to the invention can also comprise reinforcing organic fillers which can replace all or a portion of the carbon blacks or of the other reinforcing inorganic fillers described above. Mention may be made, as examples of reinforcing organic fillers, of functionalized polyvinyl organic fillers, such as described in Applications WO-A-2006/069792, WO-A-2006/069793, WO-A-2008/003434 and WO-A-2008/003435.

Preferably, the content of reinforcing filler(s) in the elastomeric composition which can be used in the external sidewall of the tyre according to the invention ranges from 1 to 90 phr, more preferably from 5 to 80 phr and in particular from 10 to 70 phr, the optimum being, in a way known per se, different according to the specific applications targeted.

The elastomeric composition and the optional reinforcing fillers described above are sufficient in themselves alone for the functions of the external sidewall of the tyre according to the invention to be fulfilled.

However, according to a preferred embodiment of the invention, the elastomeric composition described above also comprises a plasticizing agent, the role of which is to facilitate the processing of the external sidewall, in particular its incorporation in the pneumatic object, by a lowering of the modulus and an increase in the tackifying power.

This plasticizing agent is compatible with the elastomeric matrix. In contrast to the definition of an incompatible polymer, an agent compatible with the elastomeric matrix means that the mixture of this agent and of the elastomeric matrix exhibits just one glass transition temperature (Tg).

Use may be made of any type of plasticizer which can be a resin or an extending oil different from the incompatible polymer used according to the invention. The designation "resin" is reserved in the present patent application, by definition known to a person skilled in the art, for a compound which is solid at ambient temperature (23° C.), in contrast to a liquid plasticizing compound, such as an extending oil or a plasticizing oil. At ambient temperature (23° C.), these oils, which are more or less viscous, are liquids (that is to say, as a reminder, substances which have the ability to eventually assume the shape of their container), in contrast in particular to resins or rubbers, which are by nature solids.

Hydrocarbon resins are polymers well known to a person skilled in the art, essentially based on carbon and hydrogen, which can be used in particular as plasticizing agents in elastomeric compositions. They have been described, for example, in the work entitled "Hydrocarbon Resins" by R. Mildenberg, M. Zander and G. Collin (New York, VCH, 1997, ISBN 3-527-28617-9), Chapter 5 of which is devoted to their applications, in particular in the tyre rubber field (5.5. "Rubber Tires and Mechanical Goods"). They can be aliphatic, cycloaliphatic, aromatic, hydrogenated aromatic, of the aliphatic/aromatic type, that is to say based on aliphatic and/or aromatic monomers. They can be natural or synthetic and based or not based on petroleum (if such is the case, they are also known under the name of petroleum resins). They are by definition miscible (i.e., compatible) at the contents used with the elastomeric compositions for which they are intended, so as to act as true diluents. Their Tg is preferably greater than 0° C., in particular greater than 20° C. (most often between 30° C. and 120° C.).

In a known way, these hydrocarbon resins can also be described as thermoplastic resins in the sense that they soften when heated and can thus be moulded. They can also be defined by a softening point, the temperature at which the product, for example in the powder form, sticks together. The softening point of a hydrocarbon resin is generally greater by approximately 50 to 60° C. than its Tg value.

Mention may be made, as examples of such hydrocarbon resins, of those selected from the group consisting of cyclopentadiene (abbreviated to CPD) or dicyclopentadiene (abbreviated to DCPD) homopolymer or copolymer resins, terpene homopolymer or copolymer resins, terpene/phenol homopolymer or copolymer resins, $C_5$ fraction homopolymer or copolymer resins, $C_9$ fraction homopolymer or copolymer resins, α-methylstyrene homopolymer or copolymer resins and the mixtures of these resins. Mention may more particularly be made, among the above copolymer resins, of those selected from the group consisting of (D)CPD/vinylaromatic copolymer resins, (D)CPD/terpene copolymer resins, (D)CPD/$C_5$ fraction copolymer resins, (D)CPD/$C_5$ fraction copolymer resins, (D)CPD/$C_9$ fraction copolymer resins, terpene/vinylaromatic copolymer resins, terpene/phenol copolymer resins, $C_5$ fraction/vinylaromatic copolymer resins and the mixtures of these resins.

The term "terpene" groups together here, in a known way, α-pinene, β-pinene and limonene monomers; use is preferably made of a limonene monomer, a compound which exists, in a known way, in the form of three possible isomers: L-limonene (laevorotatory enantiomer), D-limonene (dextrorotatory enantiomer) or else dipentene, a racemate of the dextrorotatory and laevorotatory enantiomers. Suitable as vinylaromatic monomer are, for example: styrene, α-methylstyrene, ortho-methylstyrene, meta-methylstyrene, para-methylstyrene, vinyltoluene, para(tert-butyl)styrene, methoxystyrenes, chlorostyrenes, hydroxystyrenes, vinylmesitylene, divinylbenzene, vinylnaphthalene or any vinylaromatic monomer resulting from a $C_9$ fraction (or more generally from a $C_8$ to $C_{10}$ fraction).

More particularly, mention may be made of the resins selected from the group consisting of (D)CPD homopolymer resins, (D)CPD/styrene copolymer resins, polylimonene resins, limonene/styrene copolymer resins, limonene/D(CPD) copolymer resins, $C_5$ fraction/styrene copolymer resins, $C_5$ fraction/$C_9$ fraction copolymer resins and the mixtures of these resins.

All the above resins are well known to a person skilled in the art and are commercially available, for example sold by DRT under the name Dercolyte as regards polylimonene resins, by Neville Chemical Company under the name Super Nevtac, by Kolon under the name Hikorez or by Exxon Mobil under the name Escorez as regards $C_5$ fraction/styrene resins or $C_5$ fraction/$C_9$ fraction resins, or by Struktol under the name 40 MS or 40 NS (mixtures of aromatic and/or aliphatic resins).

Preferably, the extending oil is selected from the group consisting of polyolefinic oils (that is to say, resulting from the polymerization of monoolefinic or diolefinic olefins), paraffinic oils, naphthenic oils (of low or high viscosity), aromatic oils, mineral oils and the mixtures of these oils.

The number-average molecular weight (Mn) of the extending oil is preferably between 200 and 25 000 g/mol, more preferably still between 300 and 10 000 g/mol. For excessively low Mn weights, there exists a risk of the oil migrating outside the composition, whereas excessively high weights can result in excessive stiffening of this composition. An Mn weight of between 350 and 4000 g/mol, in particular between 400 and 3000 g/mol, has proved to constitute an excellent compromise for the targeted applications, in particular for use in a tyre external sidewall.

The number-average molecular weight (Mn) of the extending oil is determined by size exclusion chromatography (SEC), the sample being dissolved beforehand in tetrahydrofuran at a concentration of approximately 1 g/l; the solution is then filtered through a filter with a porosity of 0.45 μm before injection. The apparatus is the Waters Alliance chromatographic line. The elution solvent is tetrahydrofuran, the flow rate is 1 ml/min, the temperature of the system is 35° C. and the analytical time is 30 min. A set of two Waters columns with the Styragel HT6E name is used. The injected volume of the solution of the polymer sample is 100 μl. The detector is a Waters 2410 differential refractometer and its associated software, for making use of the chromatographic data, is the Waters Millennium system. The calculated average molar masses are relative to a calibration curve produced with polystyrene standards.

When it is used, it is preferable for the content of plasticizer to range from 2 to 60 phr, more preferably from 3 to 50 phr. Below the minimum indicated, the presence of plasticizer is not perceptible. Above the recommended maximum, the risk is encountered of insufficient cohesion of the elastomeric composition.

The elastomeric composition which can be used in the external sidewall of the tyre according to the invention can also comprise a platy filler.

The optional use of platy filler advantageously makes it possible to lower the coefficient of permeability (and thus to increase the airtightness) of the elastomeric composition, without excessively increasing its modulus, which makes it possible to retain the ease of incorporation of the external sidewall in the pneumatic object.

"Platy" fillers are well known to a person skilled in the art. They have been used in particular in tyres in order to reduce the permeability of conventional airtight layers based on butyl rubber. They are generally used at relatively low contents, generally not exceeding 1 to 50 phr, or contents by volume which can range in particular from 0.1% to 25% by volume of elastomeric composition and preferably from 1% to 20% by volume.

They are generally provided in the form of stacked plates, platelets, sheets or lamellae, with a more or less marked anisometry. Their aspect ratio (A=L/T) is generally greater than 3, more often greater than 5 or than 10, L representing the length (or greatest dimension) and T representing the mean thickness of these platy fillers, these means being calculated on a number basis. Aspect ratios reaching several tens, indeed even several hundreds, are frequent. Their mean length is preferably greater than 1 μm (that is to say that "micrometric" platy fillers are then involved), typically of between a few μm (for example 5 μm) and a few hundred μm (for example 500 μm, indeed even 800 μm).

Preferably, the platy fillers used in accordance with the invention are selected from the group consisting of graphites, silicon-based platy mineral fillers and the mixtures of such fillers.

Graphite is understood to mean, generally, an assembly of non-compact hexagonal lamellae of carbon atoms: graphenes. Graphite, a hexagonal crystalline system, exhibits a stack of ABAB type, where the B plane is translated relative to the A plane.

Graphite cannot be regarded as a reinforcing filler; however, it can be regarded as a semi-reinforcing (or partially reinforcing) filler in so far as it makes possible an increase in the tensile modulus of an elastomeric composition in which it is incorporated.

Given these definitions, graphite capable of being used in the compositions which can be used according to the invention is understood more particularly to mean:
   (a) any natural graphite, associated with rocks affected by metamorphism, after separation of the impurities accompanying the graphite veins and after milling;
   (b) any thermally expandable natural graphite, i.e. in which one or more chemical compounds in the liquid state, for example an acid, is intercalated between its graphene planes;
   (c) any expanded natural graphite, the latter being produced in two steps: intercalation of one or more chemical compounds in the liquid state, for example an acid, between the graphene planes of a natural graphite by chemical treatment and high-temperature expansion;
   (d) any synthetic graphite obtained by graphitization of petroleum coke.

The elastomeric composition which can be used in the external sidewall of the tyre according to the invention can contain just one graphite or a mixture of several graphites; thus, it is possible to have a blend of natural graphite and/or of expanded graphite and/or of synthetic graphite.

The graphite as defined above can be provided morphologically in a lamellar or non-lamellar form and will in both cases be categorized as a platy filler within the meaning of the present invention.

It has been found, surprisingly, that graphites with either of these two types of morphology are suitable in the elastomeric composition which can be used according to the invention; however, graphites exhibiting a lamellar form are preferably suitable, all the more so when they are oriented so as to present their largest face perpendicular to the gas permeation stream.

When it is used, the graphite is present in the elastomeric composition at contents ranging from 1 phr to 60 phr and preferably between 5 phr and 30 phr.

Suitable in particular among silicon-based platy mineral fillers are phyllosilicates and particularly those included in the group consisting of smectites, kaolin, talc, mica and vermiculite.

Also suitable for the invention among phyllosilicates are functionalized phyllosilicates and in particular organomodified phyllosilicates. According to a specific embodiment, the organic structure with which the inert filler is combined is a surfactant of formula: -M$^+$R$^3$R$^4$R$^5$; where M represents a nitrogen, sulphur, phosphorus or pyridine atom and where R$^3$, R$^4$ and R$^5$ represent a hydrogen atom, an alkyl group, an aryl group or an allyl group, R$^3$, R$^4$ and R$^5$ being identical or different.

In particular, organomodified montmorillonites are suitable for the invention. Thus, montmorillonites modified with a surfactant, such as a dihydrogenated dioctadecyldimethyl quaternary ammonium salt. Such an organomodified montmorillonite is commercially available, in particular from Southern Clay Products under the trade names: Cloisite 6A and 20A.

Other surfactants based on quaternary ammonium salts can also be used to modify phyllosilicates, such as are described in Patent Application WO06/047509.

Mention may be made, as examples of micas, of the micas sold by CMMP (Mica-MU®, Mica-Soft®, Briomica®, for example), those sold by Yamaguchi (A51S, A41S, SYA-21R, SYA-21RS, A21S, SYA-41R), vermiculites (in particular the Shawatec® vermiculite sold by CMMP or the Microlite® vermiculite sold by W.R. Grace), or modified or treated micas (for example, the Iriodin® range sold by Merck). Mention may be made, as examples of graphites, of the graphites sold by Timcal (Timrex® range). Mention may be made, as examples of talcs, of the talcs sold by Luzenac.

The abovementioned inert fillers, other than graphite, are in fact particularly advantageous as they make it possible to improve the impermeability of the compositions in which they are dispersed with an appropriate content. For example, when they are used, their content can range from 1 phr to 80 phr and preferably from 3 phr to 40 phr.

The introduction of the platy fillers into the elastomeric composition can be carried out according to various known processes, for example by mixing in solution, by mixing in bulk in an internal mixer, or also by mixing by extrusion.

The elastomeric composition which can be used for the external sidewall of the tyre according to the invention can furthermore comprise the various additives normally present in the external sidewalls known to a person skilled in the art. Mention will be made, for example, of non-reinforcing or inert fillers other than the platy fillers described above, plasticizers other than the abovementioned extending oils and other than the incompatible polymers used according to the invention, tackifying resins, protection agents, such as antioxidants or antiozonants, UV inhibitors, various processing aids or other stabilizing agents, or also promoters capable of favouring the adhesion to the remainder of the structure of the pneumatic object.

Another subject-matter of the invention is a process for preparing an elastomeric composition for the manufacture of tyres as defined above, characterized in that it comprises the following stages:
   incorporating the optional reinforcing filler or fillers in the elastomeric matrix during a first stage, everything being kneaded thermomechanically, in one or more goes, until a maximum temperature $T_1$ of between 110° C. and 190° C. is reached, then
   incorporating the incompatible polymer or polymers in the mixture during a second stage, until a temperature $T_2$ of greater than 110° C. is reached, then
   subsequently incorporating, during a third stage, the crosslinking system and kneading everything up to a maximum temperature of less than 90° C.

Preferably, the incorporation of the incompatible polymer or polymers in the mixture during the second stage is carried out at a maximum temperature $T_2$ at least 10° C. lower than the evaporation temperature or than the ignition point of the incompatible polymer or polymers.

Preferably, in the process according to the invention, the incompatible polymer or polymers are added by having been frozen beforehand to a temperature ranging from −70° C. to −10° C.

This is because the incompatible polymer or polymers are preferably added in the solid form in order to facilitate the processing of these polymers in the process according to the invention.

Preferably, the first and second stages are carried out in an internal mixer and the third stage is carried out in an external mixer.

Thus, subsequent to the first and second stages, the mixture is generally subjected to several passes between two rollers, the temperature of which is controlled, that is to say lower than the temperature for triggering the vulcanization. The temperature of this final stage is generally less than 90° C.

The final composition thus obtained can subsequently be calendered, for example in the form of a sheet or of a plate or also extruded, in order to form an external sidewall profiled element which can be used in the tyre according to the invention.

The invention and also its advantages will be more thoroughly understood in the light of the single FIGURE, which diagrammatically represents, in radial section, a tyre in accordance with the invention, and also of the implementational examples which follow.

The single appended FIGURE represents very diagrammatically (without observing a specific scale) a radial section of a tyre in accordance with the invention.

This tyre 1 comprises a crown 2 reinforced by a crown reinforcement or belt 6, two external sidewalls 3 and two beads 4, each of these beads 4 being reinforced with a bead wire 5. The crown 2 is surmounted by a tread, not represented in this diagrammatic FIGURE. A carcass reinforcement 7 is wound around the two bead wires 5 in each bead 4, the turn-up 8 of this reinforcement 7 being, for example, positioned towards the outside of the tyre 1, which is represented fitted to its wheel rim 9. The carcass reinforcement 7 is, in a way known per se, composed of at least one ply reinforced by "radial" cords, for example textile or metal cords, that is to say that these cords are positioned virtually parallel to one another and extend from one bead to the other so as to form an angle of between 80° and 90° with the median circumferential plane (plane perpendicular to the axis of rotation of the tyre which is located halfway between the two beads 4 and passes through the middle of the crown reinforcement 6).

The internal wall of the tyre 1 comprises an airtight layer 10, for example with a thickness equal to approximately 0.9 mm, on the side of the internal cavity 11 of the tyre 1.

Measurement Method
Depth of Grooves

In order to measure the depth of grooves, use is made of a tyre sidewall test specimen with a square section (side 15 cm) and with a thickness of 9 mm obtained by moulding. The curing of the test specimens is carried out under a pressure of 16 bar at 180° C. for 15 minutes. The test specimen is fitted to the bed of a machine-tool. A cone made of hard steel with a length of 7 mm, the angle at the vertex of which is 75°, is attached to the tool holder of the machine. To produce the cones, the radius of curvature at the end is specified at less than 0.1 mm. The cones are cleaned before use. The cone, from the point of first contact (indentation), sinks in by 4 mm or 5 mm. After the desired sinking in has been obtained, the cone is moved parallel to the mixture plate, at a rate of 5 mm per second. The appearance of the scratches which appear at the rear of the cone subsequent to the tearing of the mixture is recorded at a sufficient distance, of the order of a centimetre, from the first point at which the cone was sunk into the mixture, so that the scratch observed is not affected by a possible transitory phenomenon and becomes independent of the length slid over.

In order to compare the sidewall which can be used according to the invention with the control sidewall, a confocal microscope is used to measure the depth of the scratches. Each measurement by confocal microscopy is carried out at three different points (two on the rubber close to the scratch and one at the bottom of the scratch), where the latter is sufficiently open for the measurement to be able to be carried out.

This measurement of the scratch depth is carried out at ten different sites of the scratch and then the mean of the ten depth measurements is calculated.

EXAMPLES

1) Preparation of the Compositions

An elastomeric composition which can be used in the tyre according to the invention (composition C) and two elastomeric compositions which can be used in a comparative tyre (compositions A and B) were prepared from the ingredients and the contents in Table I below. The contents are expressed in phr.

TABLE I

| Ingredients | A (Comp.) | B (Comp.) | C (Inv.) |
|---|---|---|---|
| Natural rubber | 50 | 50 | 50 |
| Butadiene rubber[1] | 50 | 50 | 50 |
| Carbon black[2] | 25 | 25 | 25 |
| Plasticizer[3] | 10 | 20 | 10 |
| Incompatible polymer[4] | 0 | 0 | 10 |
| Antioxidant[5] | 3 | 3 | 3 |
| Wax | 1.5 | 1.5 | 1.5 |
| Stearic acid | 1 | 1 | 1 |
| ZnO | 2.5 | 2.5 | 2.5 |
| Sulphur Sol 2H | 1.5 | 1.5 | 1.5 |
| Vulcanization accelerator[6] | 1.5 | 1.5 | 1.5 |

[1]BR ND ML63,
[2]Carbon black N683,
[3]MES oil, Catenex SNR from Shell,
[4]Polyisobutene, Indopol H1200 from INEOS,
[5]N-(1,3-Dimethylbutyl)-N'-phenyl-p-phenylenediamine, 6-PPD, from Flexsys,
[6]N-Cyclohexyl-2-benzothiazolesulphenamide, Santocure CBS from Flexsys.

2) Preparation of the Test Specimens of External Sidewall Which Can Be Used in the Tyres According to the Invention The external sidewall composition of the invention is prepared in appropriate mixers, using two successive phases of preparation according to a general procedure well known to a person skilled in the art: a first phase of thermomechanical working or kneading (sometimes referred to as "non-productive" phase) at high temperature, up to a maximum temperature of 140° C., followed by a second phase of mechanical working (sometimes referred to as "productive" phase) at a lower temperature of 40° C., during which finishing phase the crosslinking system is incorporated.

In this instance, the processing of the elastomeric compositions is carried out by means of a mixer of the Haake RM 3000 type of 360 cm$^3$ with blades of CAM type.

The preparation of the external sidewall test specimens is carried out in an internal mixer, according to the following protocol described in detail in Table II.

Conventionally, in the preparation of tyres or of tyre component, the determining factor for the sequence of the stages is the temperature achieved by the mixture. The times are given by way of indication.

TABLE II

| | non-productive phase | |
|---|---|---|
| Time (in min) | Action | Temperature (° C.) |
| 0 | The elastomeric matrix (natural and butadiene rubbers) is introduced into the mixer and the mixer is started up | 80 |
| 1 | The filler (carbon black) is added to the mixer | 100 |
| 2 | The plasticizer, the antioxidant the stearic acid and the zinc oxide are added to the mixer | 110 |
| 3 | A sledgehammer blow is given in the mixer | 120 |
| 4 | The incompatible polymer is added to the mixer in the form of a frozen block prepared beforehand at −28° C. | 130 |
| 5 | The mixture is stirred until the set temperature is reached | 140 |

After cooling the mixture thus obtained during the first non-productive phase, the crosslinking system is then incorporated at 40° C., in an external open mill; everything is then mixed (productive phase) for a few minutes, for example between 2 and 15 min, in this instance 10 minutes.

3) Results

The depths of grooves are measured at two different indentations (4 and 5 mm) for the composition C which can be used according to the invention.

The results are collated in Table III below.

TABLE III

| | Depth of grooves (in cm) | | |
|---|---|---|---|
| Indentation | A (Comp.) | B (Comp.) | C (Inv.) |
| 4 mm | 0.0222 | NM* | 0.0185 |
| 5 mm | NM* | 0.0414 | 0.0245 |

NM*not measured

These results show that the comparative external sidewall test specimens prepared from the compositions A and B exhibit a greater depth of grooves than the test specimens of external sidewall which can be used according to the invention prepared from the composition C.

Consequently, the tyre comprising the sidewalls resulting from the composition C will exhibit a better resistance to outside attacks than the tyre comprising the sidewalls resulting from the compositions A and B.

The invention claimed is:

1. A tire provided with an external sidewall, said external sidewall comprising at least one elastomeric composition based on:
   (a) an elastomeric matrix comprising at least one diene elastomer,
   (b) a crosslinking system,
   (c) at least one polymer incompatible with the elastomeric matrix, and
   (d) carbon black,
   wherein the content of carbon black ranges from 10 to 70 phr,
   wherein the at least one diene elastomer is selected from the group consisting of polybutadienes, synthetic polyisoprenes, natural rubber, butadiene copolymers, isoprene copolymers, butadiene/styrene copolymers, isoprene/butadiene copolymers, isoprene/styrene copolymers, isoprene/butadiene/styrene copolymers, and mixtures thereof,
   wherein the content of the at least one diene elastomer ranges from 70 to 100 phr,
   wherein the at least one incompatible polymer is selected from the group consisting of polybutenes, and
   wherein the content of the at least one incompatible polymer ranges from 5 to 15 phr.

2. The tire according to claim 1, wherein the at least one incompatible polymer is selected from the group consisting of polymers having a number-average molecular weight of less than or equal to 20,000 g/mol.

3. The tire according to claim 2, wherein the at least one incompatible polymer is selected from the group consisting of polymers having a number-average molecular weight ranging from 200 to 4000 g/mol.

4. The tire according to claim 1, wherein the at least one incompatible polymer is a polyisobutylene.

5. The tire according to claim 1, wherein the at least one incompatible polymer is selected from the group consisting of liquids exhibiting a kinematic viscosity at 100° C. ranging from 20 to 200,000 SUS according to Standard ASTM D2161.

6. The tire according to claim 5, wherein the at least one incompatible polymer is selected from the group consisting of liquids exhibiting a kinematic viscosity at 100° C. ranging from 200 to 50,000 SUS according to Standard ASTM D2161.

7. The tire according to claim 1, wherein the at least one incompatible polymer is in the form of vesicles in the elastomeric composition.

* * * * *